Oct. 3, 1939.  C. J. GOGUEN  2,175,164
BATTERY TERMINAL
Original Filed Jan. 22, 1935
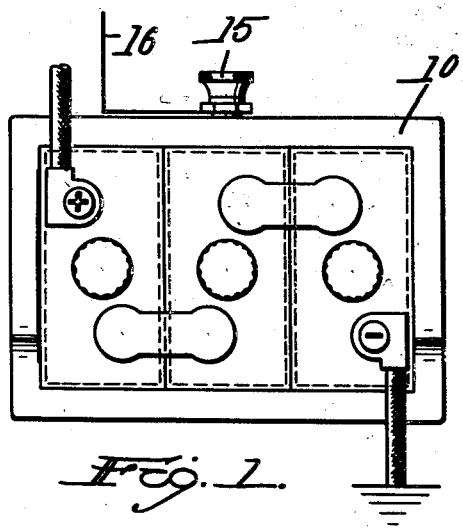
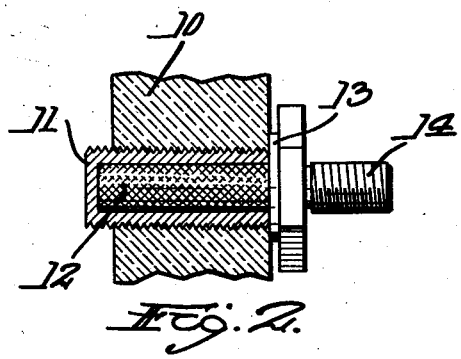
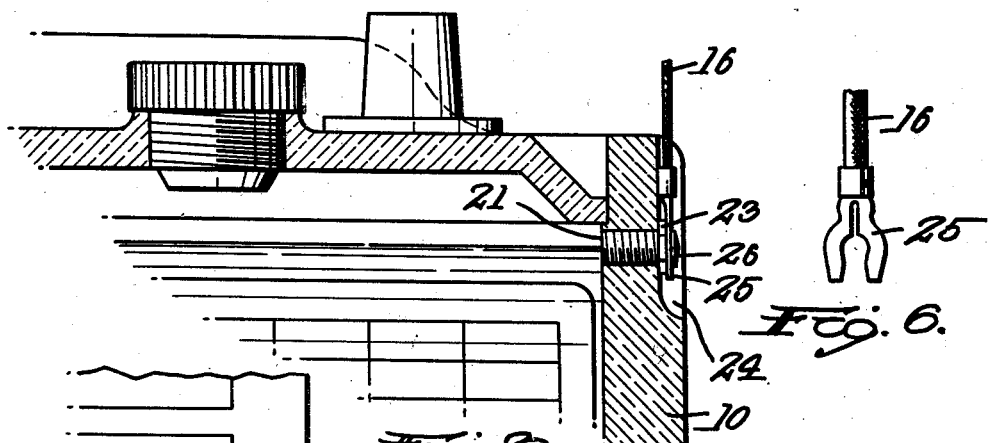
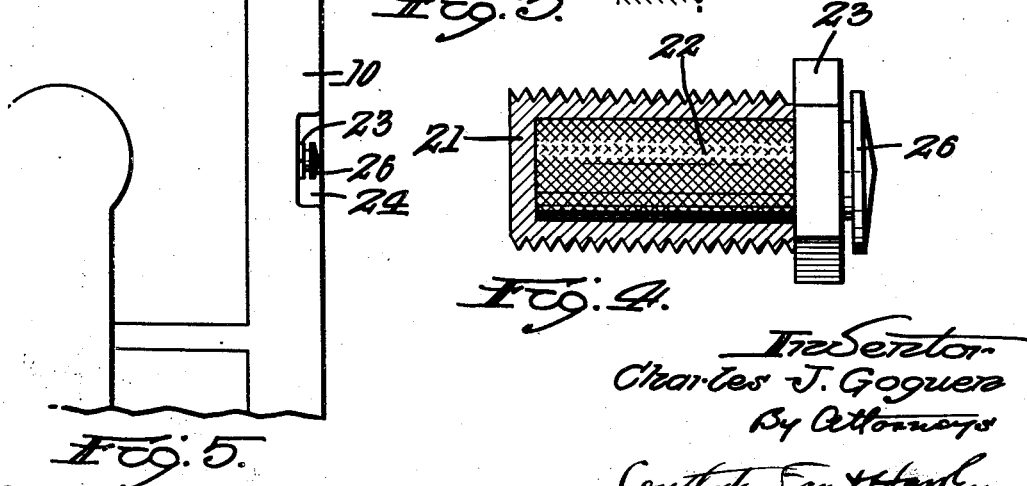

Patented Oct. 3, 1939

2,175,164

UNITED STATES PATENT OFFICE 2,175,164

BATTERY TERMINAL

Charles J. Goguen, Chicago, Ill.

Application January 22, 1935, Serial No. 2,893
Renewed March 25, 1939

1 Claim. (Cl. 136—135)

This is a continuation in part of my patent on a Battery gauge, No. 1,995,207, filed November 2, 1931.

The principal objects of the invention are to provide a connection for conducting the current to a gauge when the battery is full and which is not located in the top and is not provided with any switch. Also to eliminate all wires from the top of the battery whereby the refilling of the cells can be accomplished without interference with the wires.

Other objects and advantages of the invention will appear hereinafter.

Reference is to be had to the accompanying drawing, in which

Fig. 1 is a plan of a battery and terminal constructed in accordance with this invention;

Fig. 2 is a horizontal sectional view of the battery terminal;

Fig. 3 is a sectional view of a second form of battery and terminal;

Fig. 4 is a sectional view of the second terminal;

Fig. 5 is a plan of the battery and terminal, and

Fig. 6 is an elevation of the connector for the terminal.

An important feature of this invention is the fact that only the central cell of a three-cell battery is gauged, thus eliminating the use of switches. The battery 10 is shown as having three cells connected in the usual way and the top is of the usual construction. By this invention no wires or other electrical devices are located on the top of the battery or project down through the top of any of the cells thereof.

In the central cell of the battery at the side is introduced a terminal 11. This is screw-threaded outside and the screw-threaded exterior is made of hard lead (containing antimony) so that it can be screwed through a previously threaded hole and will not be injured by the acids of the battery. Inside it is provided with a brass knurled core 12 on which the lead is cast and securely held. It is provided with an integral collar 13 to come up against the casing of the battery outside and with a screw-threaded end 14. A thumb nut 15 is located on the screw-thread to secure the terminal of the wire 16 which goes to the gauge.

The wire 16 is connected with a gauge, preferably such as is the subject of my above mentioned application. The negative pole of the battery is grounded, making the circuit complete through the liquid in the central cell, the end cell serving as the source of power.

The effect of connecting up the circuit and having the liquid reach the screw 11, as indicated in Fig. 1, is to energize the coil of the gauge.

It will be seen therefore that the operation is very simple. Whenever the liquid is high enough, the pointer in the gauge indicates that the battery is full. When the liquid gets below the screw 11 the circuit is broken through the liquid and the pointer is no longer attracted by the elecro-magnet of the gauge but is moved back and indicates "low" on the gauge.

This works entirely automatically and it requires no switch as the gauge shows at all times whether the liquid in the battery is above or below the terminal. No wires are provided at the top of the battery to interfere with the filling or possibly short-circuit it and nothing has to be set after the device operates. It indicates only the liquid in the central cell of the battery but it is not necessary ordinarily to show anything further than this. However, if desired, a duplicate device can be employed to show the height of liquid in other cells.

This terminal 11 is permanent and screws into the battery case at a fixed level from the plates, allowing sufficient electrolyte when the gauge registers "low". It does not have to be removed, as its outer layer is of a material not affected by the battery acids. Of course, it is suitable for use for all kinds of wet batteries. The current required is very little and may be as small as 40 milliamperes or less. The above described terminal is the part of this case divided out of my above mentioned application.

In Figs. 3, 4, 5 and 6 a modification of the same is shown having substantially the same advantages. In this case the terminal is formed in a similar way but the core 22 is made of Monel metal or stainless steel and the outside coating 21 is made of cast hard lead, as before. It is located at substantially the same position as in the other case but the wall of the battery is cut out at 24 to receive the hexagonal head 23 and beyond this head there is a neck for receiving the usual spring connection 25. The end of this neck is closed by a head 26. The wire 16 is used in an obvious way. This form of the invention has the same advantages as the other but involves no projection from the side of the battery.

Having thus described my invention and the advantages thereof, I do not wish to be limited to the details herein disclosed, otherwise than as set forth in the claim, but what I claim is:

As an article of manufacture, a battery having a side wall provided with a horizontal threaded passage therethrough located at the low vertical open sided liquid level and with a recess in its outer side, a horizontal terminal of non-corrosive conducting material threaded to fit in and project through said passage with its outer end in said recess, said terminal having a fixed polygonal head for use in applying it, an integral head spaced slightly beyond the first head and a neck between the two heads for receiving a line connector and a flat bifurcated line connector located entirely in said recess for attaching a wire to the outer end of the terminal, whereby the line connector is located entirely within the vertical side wall.

CHARLES J. GOGUEN.